United States Patent [19]

Watanabe et al.

[11] Patent Number: 4,741,220
[45] Date of Patent: May 3, 1988

[54] HYDROSTATIC PRESSURE WORM-RACK DEVICES

[75] Inventors: Koya Watanabe, Numazu; Sadaji Hayama, Mishima, both of Japan

[73] Assignee: Toshiba Kikai Kabushiki Kaisha, Tokyo, Japan

[21] Appl. No.: 935,704

[22] Filed: Nov. 26, 1986

Related U.S. Application Data

[63] Continuation-in-part of Ser. No. 772,860, Sep. 5, 1985, abandoned.

[30] Foreign Application Priority Data

Sep. 12, 1984 [JP] Japan .................................. 191087

[51] Int. Cl.⁴ ...................... F16H 57/04; F10M 9/10
[52] U.S. Cl. ................................... 74/424.6; 74/468; 184/6.12
[58] Field of Search .............. 74/467, 468, 424.6; 184/6.12, 6.14

[56] References Cited

U.S. PATENT DOCUMENTS

| | | | |
|---|---|---|---|
| 3,031,897 | 5/1962 | Seidel | 74/468 |
| 3,323,385 | 6/1967 | Revitt | 74/468 |
| 3,361,003 | 1/1968 | Hodgson | 74/468 |
| 3,448,632 | 6/1969 | Rumbarger | 74/468 |
| 3,454,136 | 7/1969 | Stark | 74/467 |
| 3,595,100 | 7/1971 | Stark et al. | 74/468 |
| 3,651,706 | 3/1972 | Galbarini et al. | 74/467 |
| 3,737,008 | 6/1973 | Wagner | 74/424.6 |
| 3,752,596 | 8/1973 | Weyand et al. | 74/468 |
| 3,763,959 | 10/1973 | Neugebauer | 184/6.12 |
| 3,789,956 | 2/1974 | Neugebauer | 74/468 |
| 4,148,227 | 4/1979 | Neugebauer | 74/409 |

FOREIGN PATENT DOCUMENTS 914165 12/1962 United Kingdom .................. 74/468

OTHER PUBLICATIONS

Pressure Pad Bearings by H. Opitz, Paper 8, vol. 182, Pt3A.

*Primary Examiner*—Lawrence J. Staar
*Attorney, Agent, or Firm*—Stevens, Davis, Miller & Mosher

[57] ABSTRACT

In a hydrostatic pressure worm-rack device of the type comprising a worm formed with operating oil supply opening at the opposite flanks of respective teeth of the worm, opposite flanks of respective teeth of the rack being formed with oil pockets, there are provided an oil distributor mounted on one end of the worm shaft for supplying oil to mating surfaces and not mating surfaces of the teeth of the worm and rack and for supplying pilot oil to pilot oil supply ports provided for the flanks of the teeth at the opposite ends of the worm which firstly mate with the teeth of the rack.

6 Claims, 5 Drawing Sheets

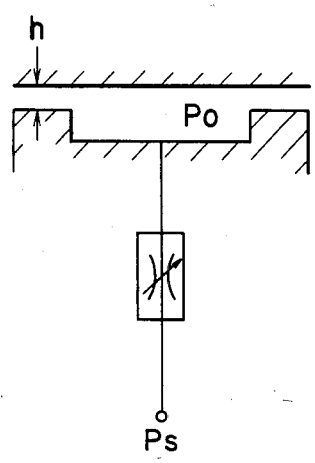
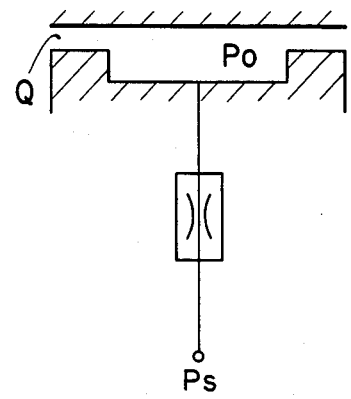
CONSTANT FLOW
QUANTITY SYSTEM
F I G. 7A
CONSTANT PRESSURE
SYSTEM
F I G. 7B
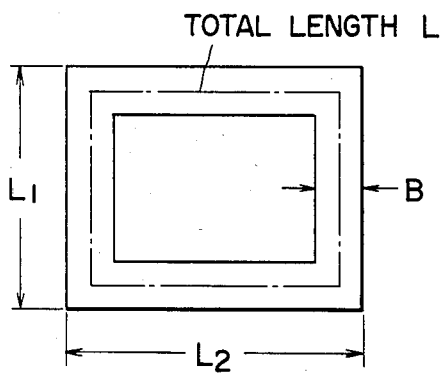
HYDROSTATIC PRESSURE PAD
F I G. 8

HYDROSTATIC PRESSURE WORM-RACK DEVICES

CROSS REFERENCE TO A RELATED APPLICATION

This application is a continuation-in-part of a copending application Ser. No. 772860, filed Sept. 5, 1985, now abandoned.

BACKGROUND OF THE INVENTION

This invention relates to a hydrostatic pressure worm-rack device utilized in a machine tool, for example.

Prior art hydrostatic pressure worm-rack devices can be classified into two types. In one type, hydrostatic pressure oil is supplied from the side of the rack, and in the other type, the hydrostatic pressure oil is supplied from the side of the worm. Examples of the former type are disclosed in U.S. Pat. Nos. 3,789,956 and 4,148,227 and examples of the latter type are disclosed in U.S. Pat. Nos. 3,595,100 and 3,763,959. The patents illustrate a construction in which the hydrostatic pressure oil is distributed from the end surfaces of a worm and a construction in which thrust forces generated in hydrostatic pressure oil pockets provided for left and right ends of a worm are caused to balance with each other.

A hydrostatic pressure worm-rack device is used in a machine tool as a feed device. With recent increase in the feed speed of the machine tool, the number of revolutions of the worm is also increased so that lubricating oil in oil pockets provided for worm teeth flanks which do not engage with the teeth of a rack is caused to splash away by centrifugal force so that when the worm subsequently engages with the rack, air would be entrapped in the oil pockets which causes a pressure variation in the oil pockets, thus failing smooth high speed feeding.

Furthermore, according to the prior art construction, since no pilot oil supply ports and pilot oil discharge grooves are provided at both ends of the worm at which the worm begins to mesh with the rack, oil pressure would rise in the oil pockets so that air remaining in the oil pockets would not be discharged with the result that the pressure in the oil pockets pulsates which prevents smooth feeding.

According to the prior art constructions, at the time of supplying operating oil to the supply ports opening in the tooth flanks, since the operating oil is supplied through one end of the worm, pressure loss occurs before the operating oil reaches the supply ports at the far end. Accordingly, it is impossible to obtain uniform pressure in respective oil pockets, thus failing high speed feeding. Moreover, no means was provided for maintaining constant the pressure of the operating oil in respective oil supply ports of the tooth flanks.

SUMMARY OF THE INVENTION

It is an object of this invention to provide an improved hydrostatic pressure worm-rack device capable of preventing entrapping air into oil pockets provided for the tooth flanks at both ends of the worm which do not mesh with the rack and maintaining uniform the pressure in a plurality of hydrostatic pressure oil pockets when the worm meshes with the rack, thereby enabling smooth and high speed feeding of a machine tool, for example.

According to this invention, there is provided a hydrostatic pressure worm-rack device of the type comprising a worm formed with operating oil supply openings at opposite flanks of respective teeth of the worm, a rack meshing with the worm, opposite flanks of respective teeth of the rack being formed with hydrostatic pressure oil pockets, drive means for driving the shaft of the worm, and means for supplying the operating oil to the supply openings of the worm, characterized in that there are provided an oil distributor mounted on one end of the worm shaft for supplying oil to mating surfaces and not mating surfaces of the teeth of the worm and the rack and for supplying pilot oil to pilot oil supply ports provided for flanks of teeth at the opposite ends of the worm which firstly mate with the teeth of the rack, oil passages provided through the worm shaft and through respective teeth of the worm for independently supplying the operating oil and the pilot oil, and flow quantity adjusting valve means installed between the operating oil supply means and the oil distributor.

BRIEF DESCRIPTION OF THE DRAWINGS

In the accompanying drawings:

FIG. 7A shows a diagrammatic sectional view of a hydrostatic pressure pad for calculating the hydrostatic pressure rigidity of the constant flow system;

FIG. 7B shows a similar view for calculating the hydrostatic pressure rigidity of the constant pressure system, and FIG. 8 is a plan view showing the annular hydrostatic pressure pad shown in FIGS. 7A and 7B.

DESCRIPTION OF THE PREFERRED EMBODIMENT

The invention will now be described with reference to the accompanying drawings.

In this specification, a term "operating oil" includes "static pressure oil", "pilot oil" and "auxiliary oil" in which static pressure oil means the operating oil supplied to oil pockets, pilot oil means the operating oil supplied to oil pockets at the time of commencement of meshing of the worm and the rack and the auxiliary oil means the operating oil supplied to oil supply ports of the worm when the worm does not mesh with the rack.

Figure 1:
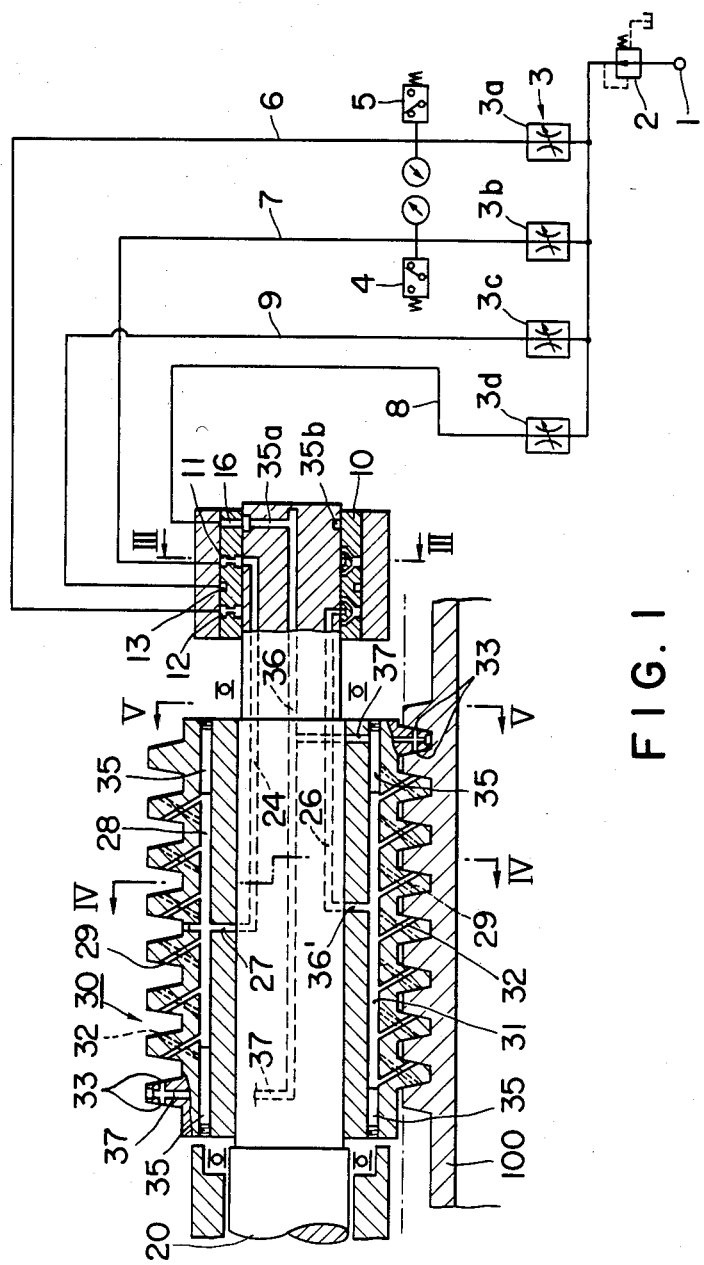
FIG. 1 is a longitudinal sectional view showing an embodiment of the hydrostatic pressure worm-rack device according to this invention.
Figure 4:
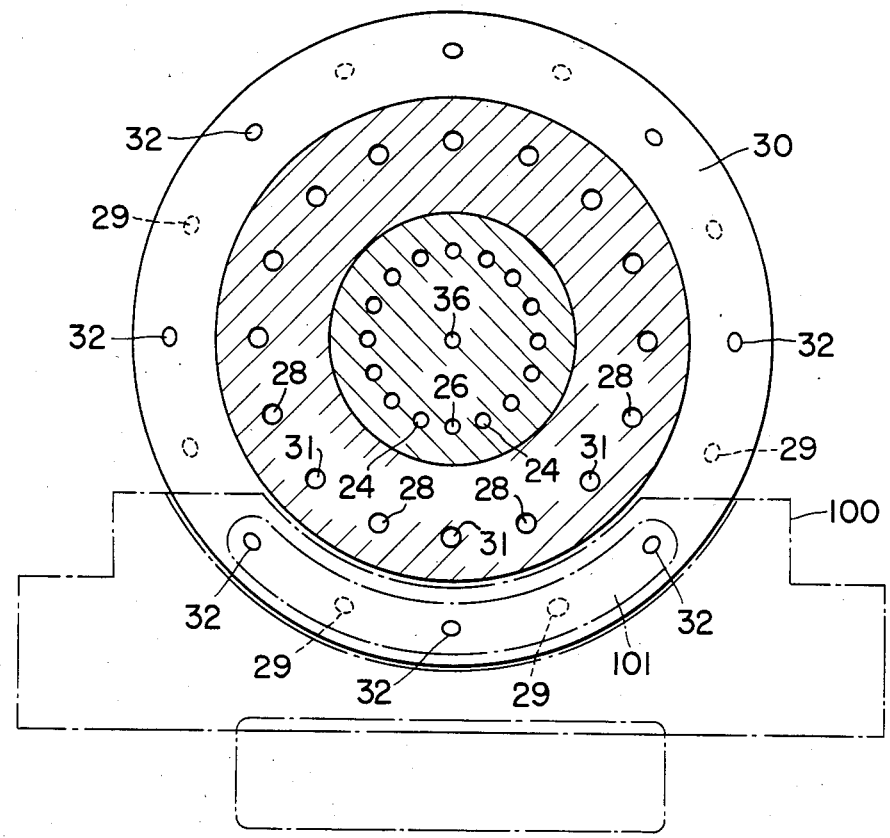
FIG. 4 is a sectional view taken along a line IV—IV in FIG. 1.

One embodiment of the hydrostatic pressure worm-rack device according to this invention will now be described. As shown in FIGS. 1 and 4, a rack 100 is secured to a stationary bed of a machine tool or the like, and a worm 30 is supported by a movable table. A driving device, for example an electric motor, for rotating the worm 30 is mounted on the table for moving the table along a slide way of the bed.

In this embodiment, operating oil is used (1) as hydrostatic oil for hydrostatically supporting the worm and the rack, (2) as pilot oil for preventing entrapping of air in hydrostatic pockets formed in the rack and (3) as auxiliary oil which discharges the operating oil out of the flanks at the opposite ends of the worm when it does not mate with the rack and prevents entrapping of air in the hydrostatic oil pockets.

The pressure of pressurized oil outputted from a source 1 (an oil pump) is adjusted to a predetermined value by a pressure reducing valve 2. Portions of the pressurized oil are adjusted to necessary flow quantities by flow quantity adjusting valves 3a~3d respectively and then supplied to peripheral grooves 11, 12, 13 and 16 of a distributor 10 rotatably mounted on a worm shaft 20 via oil conduits 6, 7, 8 and 9, respectively. The distributor 10 is constructed not to apply an undue radial force to the worm shaft 20. The pressurized oil is then supplied to the mating surfaces of the teeth of the worm and rack as follows.

We now describe the advantage of using flow quantity adjusting valves over conventional constant pressure valves utilizing fixed throttles with reference to FIGS. 7A, 7B and 8 in which FIG. 7A shows a diagrammatic sectional view of a hydrostatic pressure pad for calculating the hydrostatic pressure rigidity of the constant flow quantity system, FIG. 7B shows a similar view for calculating the hydrostatic pressure rigidity of the constant pressure system and FIG. 8 is a plan view showing the annular hydrostatic pressure pad shown in FIGS. 7A and 7B.

As is well known in the art, as the gap width h increases the hydrostatic pressure rigidity decreases. From these Figures we can obtain the following equations.

Weight supported $$W = a_f A_p P_o \quad (1)$$

Flow quantity at the hydrostatic pressure pad $$Q = \frac{Bh^3 P_o}{12 \mu L} = \frac{K_b h^3 P_o}{\mu} \quad (2)$$

where $$K_b = \frac{B}{12L}$$

Flow quantity through a throttle $$Q = \frac{\pi d^4 (P_s - P_o)}{128 \mu l} = \frac{K_c (P_s - P_o)}{\mu} \quad (3)$$

where $$K_c = \frac{\pi d^4}{128 l}$$

$\mu$: viscosity coefficient of oil
$a_f$: load coefficient
$A_p$: hydrostatic pressure pad area = $L_1 \times L_2$
$P_o$: pressure in pocket
$P_s$: original pressure
B: width of the land of the hydrostatic pressure pad
h: hydrostatic pressure gap
L: length of the land of the hydrostatic pressure pad
d: bore diameter of the throttle
l: length of the throttle By substituting equation (1) into equation (2) we obtain $$W = a_f A_p \frac{\mu Q}{K_b h^3} \quad (4)$$

From equation (4), the hydrostatic pressure rigidity of the constant flow quantity system can be expressed as follows:

$$\left( -\frac{\partial W}{\partial h} \right)_Q = \frac{3a + A_p \mu Q}{K_b h^4} \quad (5)$$

By substituting equation (2) into equation (5) we obtain $$\left( -\frac{\partial W}{\partial h} \right)_Q = 3 a_f A_p \frac{P_o}{h} \quad (6)$$

From equations (2) and (3) we obtain $$P_o = \frac{1}{1 + \frac{K_b}{K_o} h^3} P_s \quad (7)$$

By substituting equation (7) into equation (1) we obtain $$W = \frac{a_f A_p P_s}{1 + \frac{K_b}{K_c} h^3} \quad (8)$$

From equation (8) the hydrostatic pressure rigidity of the constant pressure system becomes, $$-\frac{dW}{dh} = 3 a_f A_p P_s \frac{\frac{K_p}{K_c} h^2}{\left( 1 + \frac{K_b}{K_c} h^3 \right)^2} \quad (9)$$

Equation (9) shows that the rigidity becomes a maxium when $$\frac{K_b}{K_c} h^3 = \frac{1}{2}.$$

At this time $$P_o = \frac{2}{3} P_s.$$

Hence $$\left( -\frac{dW}{dh} \right)_{max} = a_f A_p \frac{P_o}{h} \quad (10)$$

From equations (6) and (10) we can note that the hydrostatic pressure rigidity of the constant flow quantity system is 3 times larger than that of the constant pressure system.

The passages of the hydrostatic oil, the pilot oil and the auxiliary oil will now be described in detail with reference to FIGS. 1~6.

Hydrostatic oil passage

This passage is provided for the purpose of supplying the operating oil into hydrostatic pockets provided for the flanks of the teeth at the opposite ends of the worm 30 through oil supply openings for hydrostatically supporting the worm 30.

More particularly, the conduit 6 supplies the hydrostatic oil to the lefthand flank of a tooth of the worm, while the conduit 7 supplies the hydrostatic oil to the righthand flank. Conduits 6 and 7 are respectively connected to annular grooves 12 and 11 of the distributor 10. As shown in FIG. 1, the distributor 10 is rotatably supported by a stationary cylinder formed with oil passages connected to conduits 6~9 and grooves 11, 12, 13 and 16, respectively.

Figure 2:
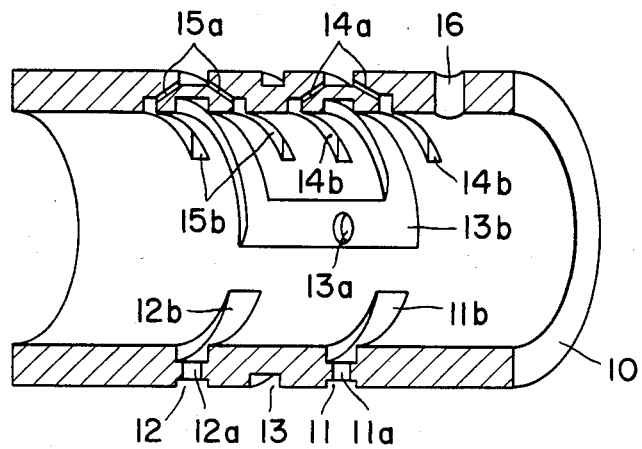
FIG. 2 is a perspective longitudinal sectional view of a distributor shown in FIG. 1.

As shown in FIG. 2, the annular groove 11 is communicated with an arcuate groove 11b on the inner surface of distributor 10 through an opening 11a. In the same manner, the annular groove 12 is communicated with an arcuate groove 12b through an opening 12a.

Figure 3:
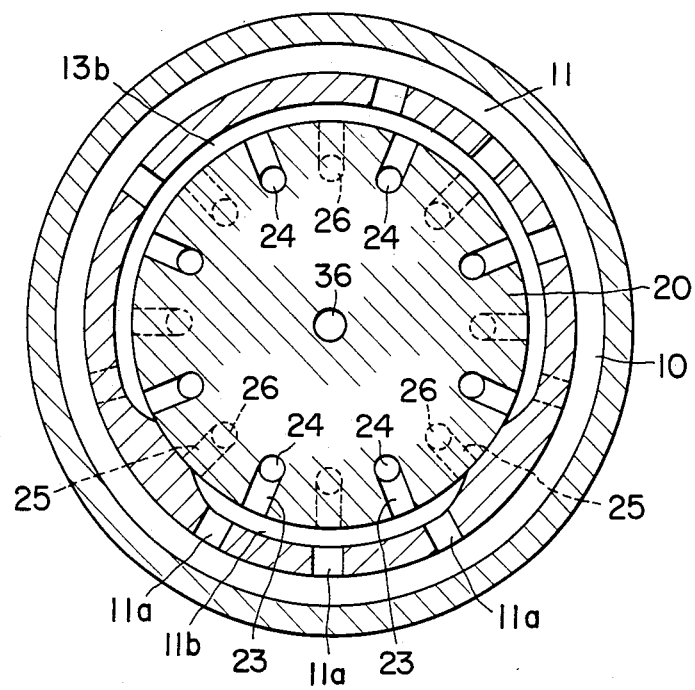
FIG. 3 is a sectional view taken along a line III—III in FIG. 1.

As shown in FIG. 3, the worm shaft 20 is formed with oil passages 23 and 25 at positions corresponding to the arcuate grooves 11b and 12b. Further, the worm shaft 20 is provided with longitudinal oil passages 24 and 26 which are disposed at an equal circumferential spacing on a circle having a center at the axis of the worm shaft 20. Oil passages 24 and 26 are connected to oil passages 23 and 25 respectively. At about the central portion of the worm shaft 20, the oil passage 24 is connected with a radial passage 27 which in turn is connected with a plurality of longitudinal oil passages 28 through the worm 30, which are spaced equally in the circumferential direction. A plurality of oil passages 29 are connected to the oil passages 28 through respective teeth of the worm for supplying hydrostatic oil and the auxiliary oil to the lefthand flanks of respective teeth of the worm 30. In the same manner, the hydrostatic oil and the auxiliary oil are supplied to the righthand flanks of respective teeth through oil passages 32 connected to oil passages 31. These oil passages 28 and 31 formed through the worm shaft 20 are spaced equally in the circumferential direction in the same manner as oil passages 24 and 26.

The pressure generated by the operating oil supplied to arcuate grooves 11b and 12b of the distributor 10 shown in FIG. 2 creates a force tending to urge the worm shaft 20 thus causing the same to deflect. Accordingly, it is necessary to eliminate this force. For creating the same pressure in the surface opposing the arcuate grooves 11b and 12b, pairs of arcuate grooves 14b and 15b are formed in the inner surface of the distributor 10 and the operating oil supplied to the annular grooves 11 and 12 is supplied to these arcuate grooves 14b and 15b via openings 14a and 15a.

With the oil passage arrangement of supplying the hydrostatic oil to the flanks of the teeth of the rack, the hydrostatic oil is supplied to the lefthand oil pocket 101' through a circuit including conduit 7, annular groove 11, opening 11a, arcuate groove 11b, oil passages 23, 24, 27, 28 and 29. In the same manner, the hydrostatic oil is supplied to the righthand oil pocket 101 provided for the rack teeth through conduit 6, annular groove 12, opening 12a, arcuate groove 12b, oil passages 25, 26, 36', 31 and 32. In this manner, the left- and righthand flanks of the worm teeth are hydrostatically supported by the oil supplied to hydrostatic pressure pockets 101 and 101' formed in the rack 100.

Figure 4A:
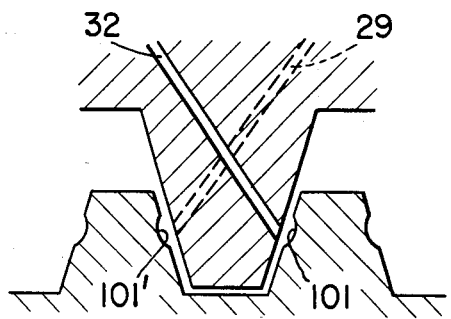
FIG. 4A is a partial sectional view of the teeth of the worm and rack showing the relation between oil supply passages through the teeth of the worm and oil pocket provided for the rack teeth.
Figure 5:
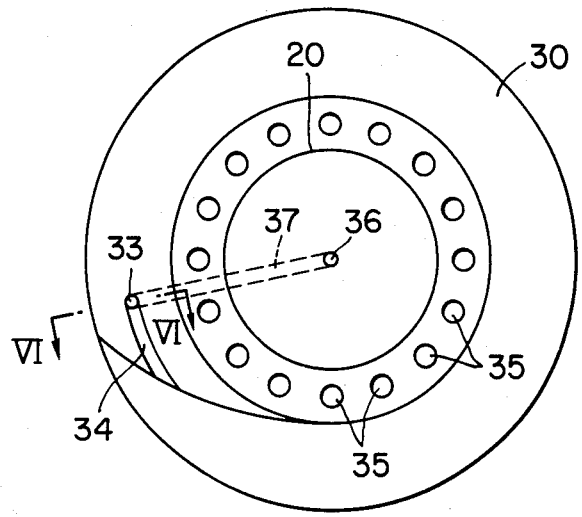
FIG. 5 is a sectional view taken along a line V—V in FIG. 1.

The auxiliary oil utilized for the purpose of preventing air entrapping is supplied to ports 34 on the not mating flanks of the teeth of the worm at both ends thereof through a circuit including conduit 9, annular groove 13 of the distributor 10, opening 13a, a hollow square shaped groove 13b, oil passages 24, 26, 27, 36', 28, 31, 29 and 32. As best shown in FIG. 4A, passages 29 and 32 are alternately formed through the worm.

Figure 6:
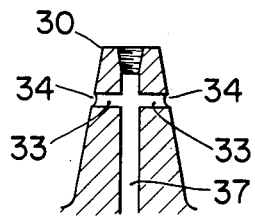
FIG. 6 is a sectional view taken along a line VI—VI in FIG. 5.

For the purpose of maintaining the oil pressure in a plurality of axial oil passages 28 and 31 at a constant value, it is necessary to make constant the axial length of these passages. For this purpose, adjusting pins 35 having a length corresponding to the lead angle of worm 30 are threaded into both ends of the oil passages as shown in FIG. 1, the length being measured from the end surfaces of the worm. The purpose of the adjusting pin or plug 35 is to prevent formation of an air space causing a fluctuation of the oil pressure. At the time of commencement of the meshing of the worm 30 and rack 100, for the purpose of supplying the pressurized oil to the hydrostatic oil pockets at the opposite ends of the worm, cleaning of the rack flanks and removing residual air, arcuate grooves 34 leading to points at which meshing starts are formed on the opposite flanks of the teeth at both ends as shown in FIG. 6. The pilot oil is supplied to oil supply ports 33 through a circuit including flow quantity adjusting valve 3d, conduit 8, oil passage 16, annular groove 35b of the worm shaft, opening 35a, axial passage 36 and radial oil passages 37.

The hydrostatic pressure worm-rack device according to this invention has the following advantages.

(1) Since the operating oil does not splash away from the not mating flanks of the worm teeth when the worm is rotated and since no air is entrapped between the mating flanks of the worm and rack, the pressure in the hydrostatic pressure oil pockets would not vary thus ensuring smooth feeding.

(2) Since pilot openings and pilot grooves are formed at the end flanks of the worm, at the time of engaging of the worm and the rack, the pressure does not rise between the inlet and outlet ports of the hydrostatic pressure oil pockets. Moreover, since there is no air remaining in the hydrostatic pressure oil pockets the pressure therein does not pulsate, thus ensuring smooth feeding.

(3) Since the operating oil is supplied to flanks from the center of the axial oil passage formed in the worm shaft, and moreover since the length of the axial oil passages 28 and 31 are made constant, it is possible to create uniform oil pressure in the oil pockets.

(4) As described with mathematical equations the hydrostatic pressure rigidity of the constant flow quantity system utilizing the flow quantity adjusting valves 3a~3d is 3 times larger than that of the constant pressure system.

What is claimed is:

1. In a hydrostatic pressure worm-rack device of the type comprising a worm formed with operating oil supply openings at opposite flanks of respective teeth of the worm, a rack meshing with said worm, opposite flanks of respective teeth of said rack being formed with hydrostatic pressure oil pockets, drive means for driving a shaft of said worm, and means for supplying the operating oil to said supply openings of said worm, the improvement which comprises:

an oil distributor mounted on one end of said worm shaft for supplying oil to mating surfaces and non mating surfaces of the teeth of said worm and said rack and for supplying pilot oil to pilot oil supply ports provided for flanks of teeth at the opposite ends of said worm which firstly mate with the teeth of said rack;

oil passages provided through said worm shaft and through respective teeth of said worm for independently supplying said operating oil and said pilot oil;

flow quantity adjusting valve means installed between said operating oil supply means and said oil distributor, said flow quantity adjusting valve means having a constant flow quantity characteristic; and adjusting pins having a length of a lead angle of said worm and respectively threaded into ends of said oil passages.

2. The hydrostatic pressure worm-rack device according to claim 1 wherein said oil distributor is provided on its inner surface with a first pair of arcuate grooves for supplying the pressurized oil to opposite flanks of the teeth of said worm, and with a second pair of arcuate grooves diametrically opposing said first pair of arcuate grooves and having the same pressure area as said first pair of arcuate grooves.

3. The hydrostatic pressure worm-rack device according to claim 1 wherein said oil passages comprise a plurality of axial oil passages in said worm axis and spaced equally in a circumferential direction on a circle concentric with an axis of said worm shaft and a plurality of radial oil passages equally spaced in the circumferential direction and connected to an annular groove of said oil distributor.

4. The hydrostatic pressure worm-rack device according to claim 1 wherein a pilot oil supply passage and a hydrostatic oil supply opening adjacent thereto are spaced such that said pilot oil supply passage and said hydrostatic oil supply opening do not open in the same oil pocket.

5. The hydrostatic pressure worm-rack device according to claim 1, wherein opposite flanks of teeth at both ends of said worm are provided with grooves leading to points at which meshing of said worm and said rack starts, said grooves supplying said operating oil to said flanks.

6. The hydrostatic pressure worm-rack device according to claim 5 wherein each one of said grooves is arcuate about an axis of said worm.

* * * * *